(12) United States Patent
Chen et al.

(10) Patent No.: US 11,782,400 B2
(45) Date of Patent: Oct. 10, 2023

(54) INDIRECT FEEDBACK TUNING APPARATUSES AND METHODS FOR TUNING PHOTONIC SYSTEMS

(71) Applicant: The Hong Kong University of Science and Technology, Kowloon (HK)

(72) Inventors: Xuanqi Chen, Kowloon (HK); Jiang Xu, Kowloon (HK); Zhifei Wang, Kowloon (HK); Yuxiang Fu, Kowloon (HK)

(73) Assignee: THE HONG KONG UNIVERSITY OF SCIENCE AND TECHNOLOGY, Kowloon (HK)

( * ) Notice: Subject to any disclaimer, the term of this patent is extended or adjusted under 35 U.S.C. 154(b) by 487 days.

(21) Appl. No.: 17/114,996

(22) Filed: Dec. 8, 2020

(65) Prior Publication Data

US 2021/0181696 A1   Jun. 17, 2021

Related U.S. Application Data

(60) Provisional application No. 62/974,661, filed on Dec. 17, 2019.

(51) Int. Cl.
*G02B 6/12* (2006.01)
*G02B 6/293* (2006.01)
(Continued)

(52) U.S. Cl.
CPC ....... *G05B 13/041* (2013.01); *G02B 6/12007* (2013.01); *G05B 13/0265* (2013.01);
(Continued)

(58) Field of Classification Search
CPC ............ G02B 6/12007; G02B 6/29338; G02B 6/2935; G02B 6/29395
See application file for complete search history.

(56) References Cited

U.S. PATENT DOCUMENTS 9,063,354 B1   6/2015   Rakich et al.
2016/0011368 A1   1/2016   Ptasinski et al.
(Continued)

FOREIGN PATENT DOCUMENTS

| CN | 107134712 | 9/2017 |
| CN | 110218360 | 9/2019 |
| KR | 20190088892 | 7/2019 |

OTHER PUBLICATIONS

Saeedi et al., "Silicon-photonic PTAT temperature sensor for microring resonator thermal stabilization," Optics Express, vol. 23, No. 17, Aug. 24, 2015, 9 pages.
(Continued)

*Primary Examiner* — Joseph L Williams
(74) *Attorney, Agent, or Firm* — Amin, Turocy & Watson, LLP

(57) ABSTRACT

Various indirect feedback tuning apparatuses and methods for tuning photonic systems are enabled. For instance, a system can perform operations, such as: determining a temperature of an optical device, determining, based on the temperature of the optical device and a feedback model, a tuning input to stabilize an optical signal, and performing, based on the tuning input, feedback tuning, wherein the feedback tuning comprises thermal tuning and electrical tuning.

20 Claims, 13 Drawing Sheets

(51) Int. Cl.
*G05B 13/04* (2006.01)
*H04B 10/70* (2013.01)
*G05B 13/02* (2006.01)

(52) U.S. Cl.
CPC ........... *H04B 10/70* (2013.01); *G02B 6/2935* (2013.01); *G02B 6/29338* (2013.01); *G02B 6/29395* (2013.01)

(56) References Cited

U.S. PATENT DOCUMENTS

| | | |
|---|---|---|
| 2017/0045689 A1 | 2/2017 | Zhang et al. |
| 2018/0364071 A1 | 12/2018 | Rivera |
| 2019/0258598 A1 | 9/2019 | Sheth et al. |
| 2019/0294199 A1* | 9/2019 | Carolan ................ G06N 3/0675 |
| 2019/0339468 A1 | 11/2019 | Evans et al. |
| 2019/0391335 A1 | 12/2019 | Tan et al. |

OTHER PUBLICATIONS

Padmaraju et al., "Thermal stabilization of a microring modulator using feedback control," Optics Express, vol. 20, No. 27, Dec. 17, 2012, 10 pages.

Altaha et al., "Silicon-Photonic Devices: Electronic Control and Stabilization," IEEE Canadian Conference on Electrical and Computer Engineering, 2016, 4 pages.

Fu et al., "Automatic Control of the Silicon Microring OSR and Multiplexer in DML-based WDM Transmitter for 40G TWDM-PON OLT," IEEE, 2016, 2 pages.

Chen, et al. "Simultaneously Tolerate Thermal and Process Variations through Indirect Feedback Tuning for Silicon Photonic Networks" IEEE Xplore, Transactions on Computer-Aided Design of Integrated Circuits and Systems, Nov. 3, 2020, 14 pages.

* cited by examiner

INDIRECT FEEDBACK TUNING APPARATUSES AND METHODS FOR TUNING PHOTONIC SYSTEMS

CROSS REFERENCE TO RELATED APPLICATION

The subject patent application claims priority to U.S. Provisional Patent Appln. No. 62/974,661, filed Dec. 17, 2019, and entitled "An Indirect Feedback Tuning Method for Photonic System," the entirety of which application is hereby incorporated by reference herein.

TECHNICAL FIELD

The present disclosure generally relates to tuning of photonic systems and associated methods.

BACKGROUND

Photonic devices are revolutionizing computing systems by improving energy efficiency, bandwidth, and latency of data movement and data processing. Photon-based systems possess tremendous advantages, as compared to electron-based systems. For instance, data transmission bit rates of optical transceivers outpace electron-based systems. Additionally, optical neural networks process data more rapidly than their predecessors.

However, photonic systems also present obstacles, such as thermal and process variation. Photonic devices are known to be highly sensitive to temperature variation. This sensitivity is compounded by the fact that photonic devices are frequently placed in environments that experience a large range of temperatures. Additionally, photonic devices inherently possess random process variations/deviations resulting from manufacturing. This can lead to inconsistencies from device to device. As compared to traditional electronic circuits, variations in photonic circuits can be more severe. The variations in photonic circuits can be more severe for several reasons, such as: (i) high geometric and thermal sensitivities of optical parameters; (ii) more complex multi-particle interactions for active photonic components, including photons, holes, and electrons; and (iii) serious process-induced parasitic effects in Giga-speed applications.

Thermal variation is typically caused by runtime heat variation and environmental temperature fluctuations. In silicon photonic networks, especially for multicore processors, the runtime heat variation is dominant since the core power can reach several watts and the core can have a busy or idle status depending on the applications. When using dynamic-voltage frequency-scaling (DVFS) techniques, the situation of thermal variation becomes more complicated. Process variation can be influenced by the fabrication variability. Many geometrical parameters, such as the structure of the waveguide, the gap of the directional coupler, and the surface roughness and bending rate, can affect the performance of optical components. The doping process is another source of process variation, particularly in active photonic components.

Thus, tuning of photonic devices is required. Tuning significantly improves bit error rates (BERs) of optical systems. Conventional photonic tuning, however, significantly increases overall power consumption and optical loss. Further, conventional photonic tuning systems merely target temperature stabilization, and do not focus on the essential problem: reliability as reflected in the optical signal passing through a device. Therefore, there exists a need for improved photonic tuning which reduces bit error rates and power consumption.

The above-described background relating to photonic systems is merely intended to provide a contextual overview of some current issues and is not intended to be exhaustive. Other contextual information may become further apparent upon review of the following detailed description.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
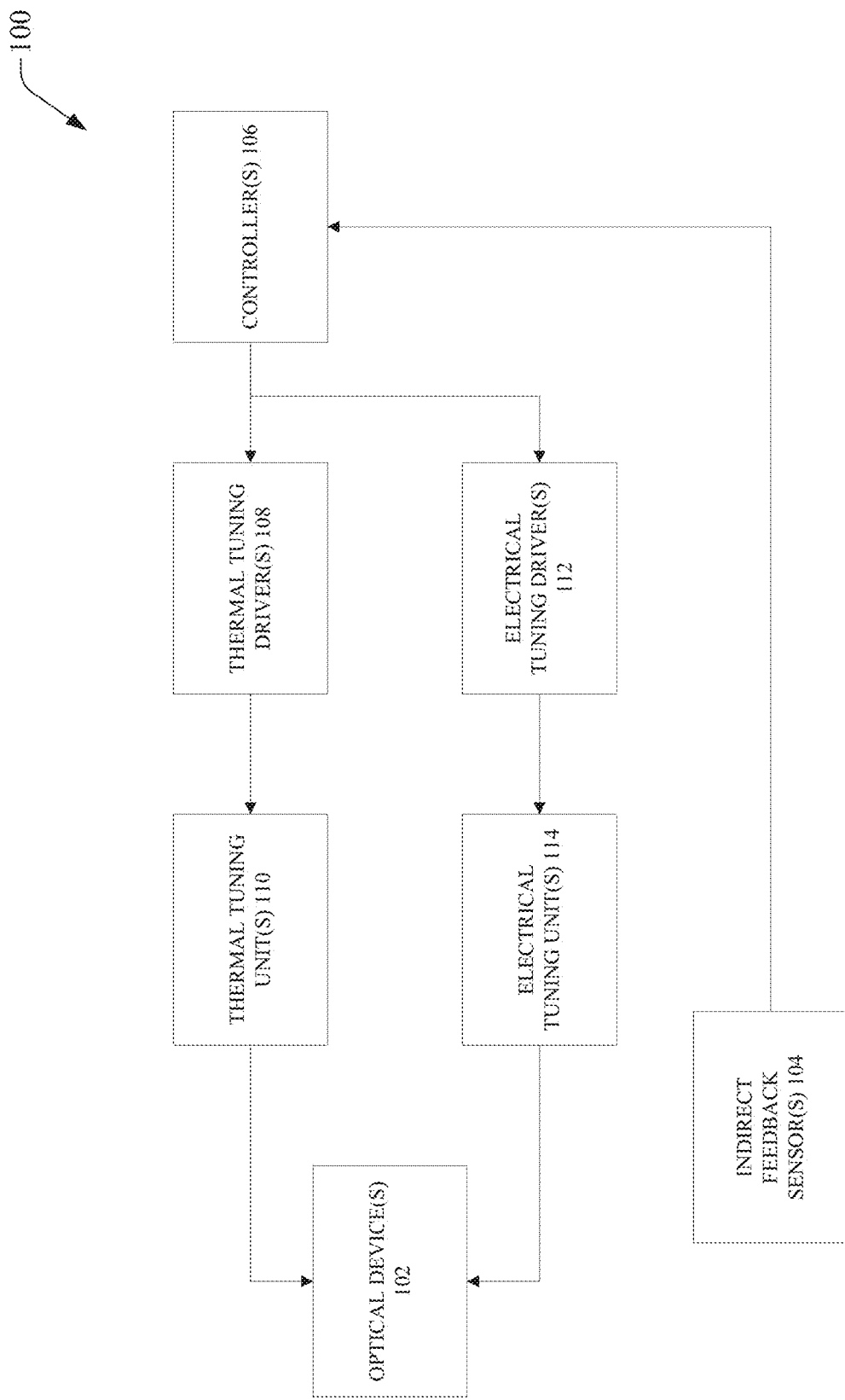
FIG. 1 illustrates a system in accordance with one or more embodiments described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Embodiments described herein provide apparatuses and methods that enable improved photonic device and system reliability while reducing power consumption and physical footprint. Embodiments herein can significantly improve BERs (e.g., to $10^{-9}$ BER for reliable communications). Embodiments described herein can additionally support wavelength-division multiplexing (WDM). With WDM, an optical bit rate in one waveguide can be further scaled up to 400 Gbps. Further embodiments can be utilized in optical modulators, optical switches, optical filters, data centers, or other suitable applications. Embodiments described herein can require low amounts of energy for tuning and can utilize a low sampling rate.

Embodiments described herein can comprise a processing unit that executes executable instructions to facilitate performance of operations, comprising: determining a temperature of an optical device, determining, based on the temperature of the optical device and a feedback model, a tuning input to stabilize an optical signal, and performing, based on the tuning input, feedback tuning, wherein the indirect feedback tuning comprises thermal tuning and electrical tuning.

Performing thermal tuning can occur using a pulse-width modulation circuit, a digital-to-analog conversion circuit, or a gain-tunable amplifier. Electrical tuning can occur using a digital-to-analog conversion or a gain-tunable amplifier. Electrical can comprise tuning a voltage or a current of the optical device.

Feedback models can be based on historical tuning information associated with optical devices described herein. Machine learning can be utilized to repeatedly determine thermal effects and feedback models. Such feedback models can be associated with the optical device, surrounding environments, tuning systems/circuits themselves, historical tuning information associated with an optical device, an optical, thermal, or electrical signal, or other suitable basis for models.

Temperatures of optical devices can be determined using one or more temperature sensitive integrated circuits/circuit blocks.

A prediction of a device and a surrounding environment of the device and a can be determined. Predictions can be based on temperature, a power level of a heater, or historical tuning information. No-thermal-tuning temperature can be based on a feedback model, and a feedback model can comprise a thermal model of an optical device. Such an optical device can comprise a microresonator or a Mach-Zehnder Interferometer. The microresonator can comprise a microring resonator, a microdisk resonator, or a different type of optical resonator. Systems and/or photonic devices described herein can be communicatively coupled to a photonic network, or computationally coupled to a photonic processing system, or coupled to a hybrid photonic and electronic system.

Additional embodiments described herein can comprise a method. The method can comprise determining, by a system operatively coupled to at least one processing unit, feedback from group of photonic devices, determining, by the system and based on the feedback of the group of photonic devices, models associated with the group of photonic devices, and performing, by the system and based on the models, indirect feedback tuning, wherein the indirect feedback tuning comprises thermal tuning and electrical tuning.

Photonic devices described herein can comprise a photonic switch, photonic modulator, a photonic filter, or other suitable photonic devices. Determining feedback herein using indirect feedback tuning need not utilize a port of the photonic device. Further, feedback can be performed on a singularity or plurality of various photonic devices.

Methods described herein can comprise quantitively storing empirical curves or test curves of a predicted future feedback signal/tuning or a current feedback signal/tuning. Such a predicted future feedback signal can be based on feedback and a model. Such models can comprise a model of a tuning system, a model of a photonic device, a model of an environment surrounding a photonic device, or another suitable model.

Further embodiments described herein can comprise a machine-readable storage medium, comprising executable instructions that, when executed by one or more processing units, facilitate performance of operations, comprising: determining indirect feedback tuning to perform on a photonic device, comprising: indirectly determining an optical signal of the photonic device, determining, based on the optical signal of the photonic device and a feedback model, the indirect feedback tuning required to decrease a bit error rate of the photonic device, and causing a model-based controller to apply the indirect feedback tuning.

Indirect feedback tuning can comprise thermal tuning and electrical tuning. Indirect feedback can be determined using machine learning to repeatedly or dynamically determine thermal effects and the feedback model, and wherein the feedback model is associated with the photonic device. It additionally be appreciated that such feedback models can be based on optical models, thermal models, and/or electrical models.

The above aspects of the disclosure and/or other features of respective embodiments thereof are described in further detail with respect to the respective drawings below. It should be appreciated that additional manifestations, configurations, implementations, protocols, etc. can be utilized in connection with the following components described herein or different/additional components as would be appreciated by one skilled in the art.

With reference to FIG. 1, there is illustrated a system 100 for indirect feedback tuning in accordance with various embodiments described herein. The system 100 can comprise one or more of an optical device 102, one or more of an indirect feedback sensor 104, one or more of a controller 106, one or more of a thermal tuning driver 108, one or more of a thermal tuning unit 110, one or more of an electrical tuning driver 112, and one or more an electrical tuning unit 114.

The optical device 102 can comprise a microresonator or Mach-Zehnder interferometers. Such microresonators can comprise microring resonators, microdisk resonators, or other suitable microresonators. It can be appreciated that while one optical device is depicted herein, the optical device 102 can comprise a plurality of optical devices.

The indirect feedback sensor 104 can sense conditions, such as an optical signal or a temperature of an optical device 102, an environmental temperature surrounding an optical device 102, a tuning circuit associated with the optical device 102, or other suitable conditions. It can be appreciated that corresponding feedback can be used to tune optical devices or adjust their statuses. According to an embodiment, feedback does not comprise optical power intensities or photo currents of photodetectors.

According to an embodiment, the indirect feedback sensor 104 can comprise a 12-bit temperature sensor. The indirect feedback sensor 104 can be based on a temperature-sensitive current source, and an amplified temperature voltage can be further sampled by a successive approximation analog to digital converter (SAR ADC). According to an embodiment, the indirect feedback sensor 104 can comprise the SAR ADC. Stated otherwise, an SAR ADC can be included in the indirect feedback sensor 104. According to an embodiment, the indirect feedback sensor can comprise a temperature-sensitive transistor(s).

The controller 106 can utilize models (as will be later discussed in greater detail) to assist with optical tuning. Such models can be obtained, for instance, before tuning or established during tuning. According to an embodiment, such models can change over time, adapting to changing conditions and associated outcomes. According to an embodiment, a controller 106 can utilize predictive control methods, optical control methods, or machine learning methods as will be later discussed in greater detail, to generate models in accordance with various embodiments described herein. A model utilized by a controller 106 can be based on a whole or a part of an optical device, a whole or a part of their respective tuning environment, or a whole or a part of an associated tuning circuit.

Thermal tuning driver 108 can comprise a circuit to drive a thermal tuning unit 110. Thermal tuning driver 108 can utilize a digital-to-analog converter, a pulse-width-modulation circuit, digital-to-analog conversion circuit, or a gain-tunable amplifier. The thermal tuning unit 110 can comprise a heater or a cooler. In this regard, the thermal tuning unit 110 can adjust a temperature of an optical device 102. It can be appreciated that thermal tuning unit 110 can tune an optical device 102 by adjusting its temperature, a corresponding environmental temperature, and/or an associated tuning circuit temperature.

Electrical tuning driver 112 can comprise a digital-to-analog converter and/or an amplifier (e.g., a gain-tunable amplifier). Electrical tuning driver 112 can comprise circuits to drive an electrical tuning unit 114. An electrical tuning unit 114 can tune an optical device 102 by carriers and/or electrical fields. Associated methods to control carriers can include carrier injection, carrier depletion, and/or carrier accumulation. It can be appreciated that the electrical tuning driver 112 can tune a voltage or a current of an optical device 102.

Figure 2:
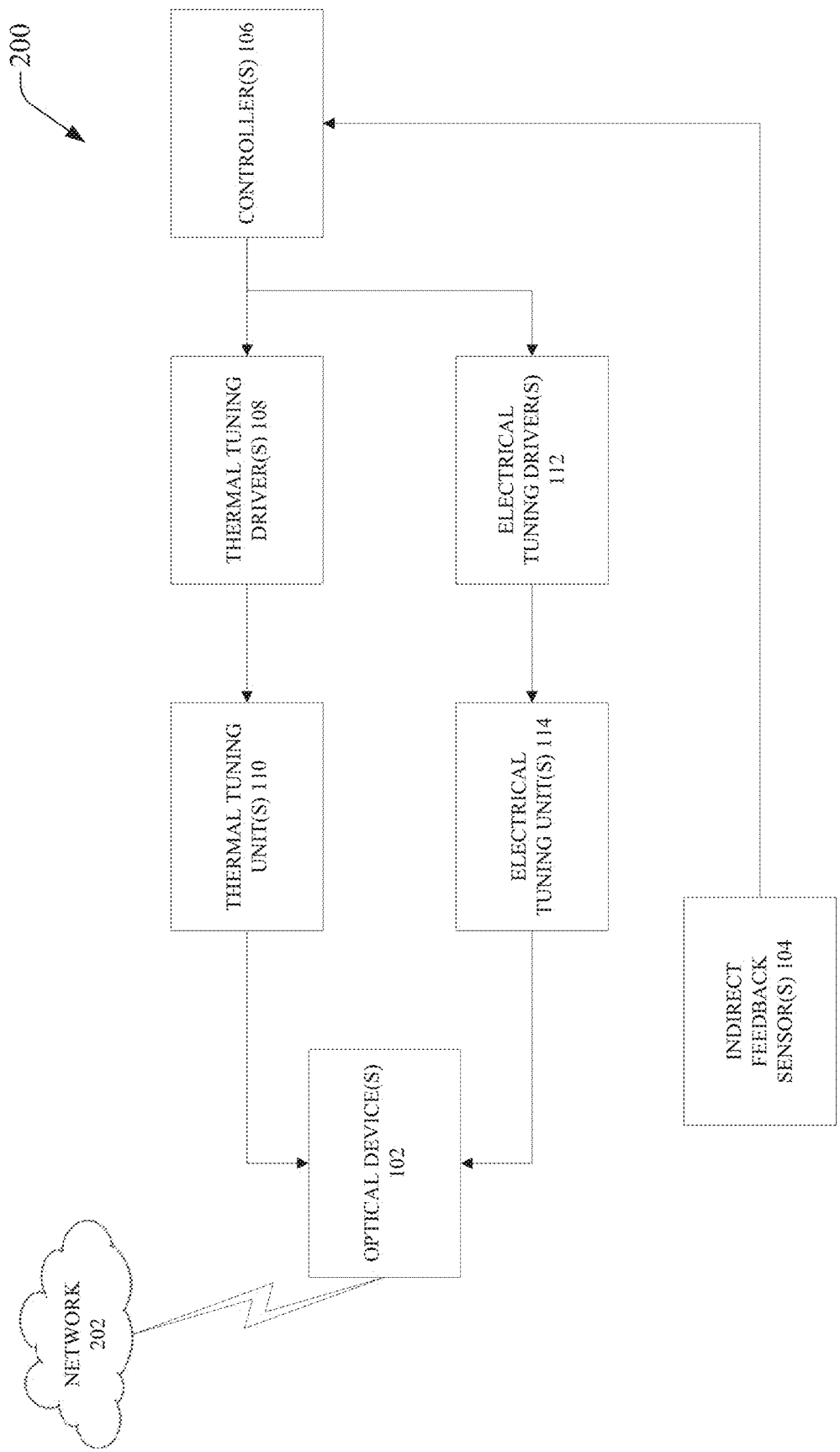
FIG. 2 illustrates a system in accordance with one or more embodiments described herein.

With reference to FIG. 2, there is illustrated a system 200 for indirect feedback tuning in accordance with various embodiments described herein. The system 200 can comprise one or more of an optical device 102, one or more of an indirect feedback sensor 104, one or more of a controller 106, one or more of a thermal tuning driver 108, one or more of a thermal tuning unit 110, one or more of an electrical tuning driver 112, and one or more of an electrical tuning unit 114. In this regard, it can be appreciated that the system 200 can be similar to the system 100.

The system 200 can additionally comprise a network 202. In this regard the optical device 102 can be communicatively coupled to the network 202. According to an embodiment, the network 202 can comprise a photonic network. According to another embodiment, the network 202 can comprise a network-on-chip. According to yet another embodiment, the network 202 can comprise additional optical devices 102, connecting a plurality of optical device 102. In further embodiments, the network 202 can comprise a computationally coupled photonic processing system, or a coupled hybrid photonic and electronic system (e.g., a system comprising photonic and electronic systems or subsystems). In additional embodiments, the network 202 can comprise an optical neutral network or an optical ranging system.

Figure 3:
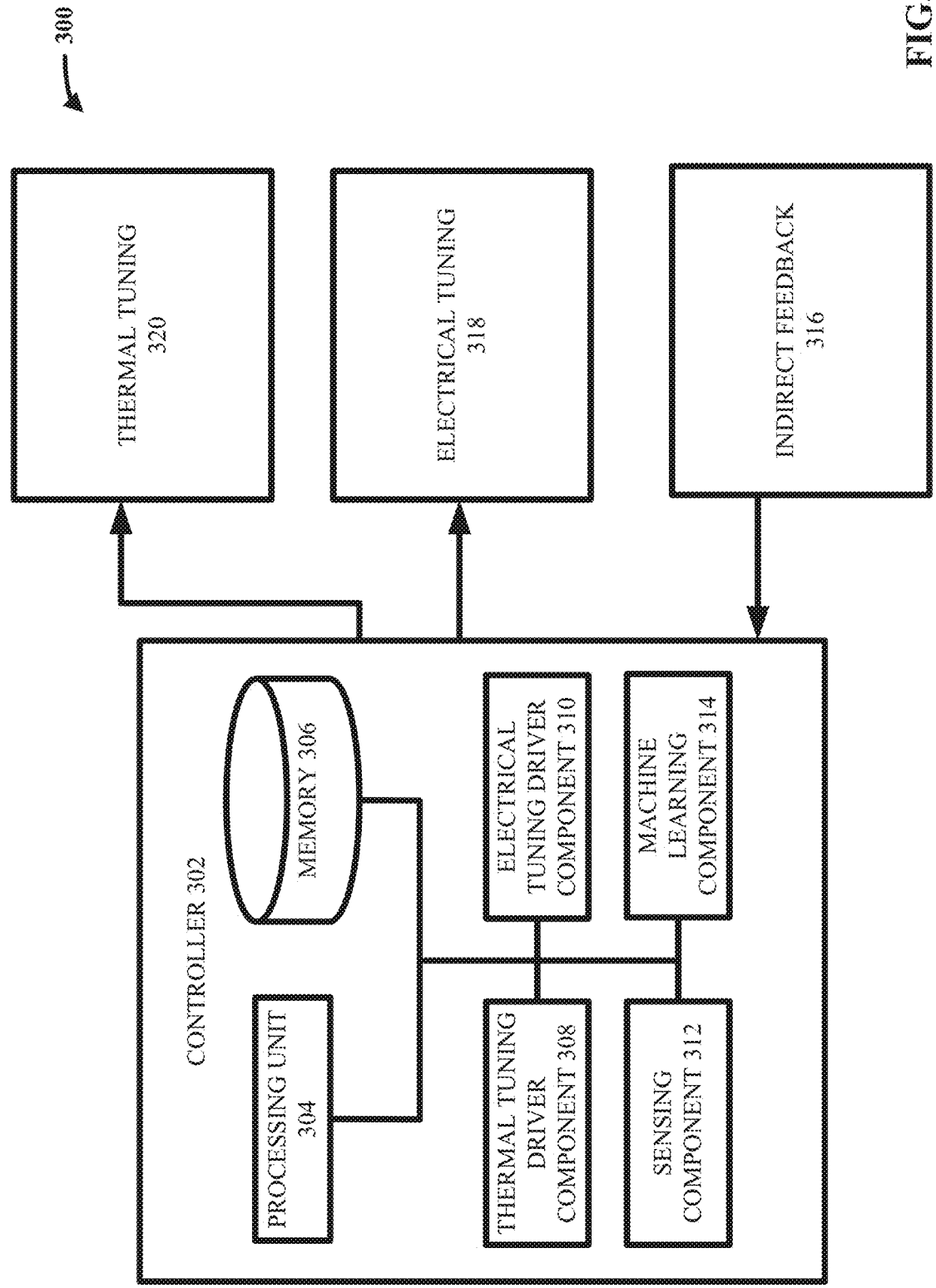
FIG. 3 illustrates a system in accordance with one or more embodiments described herein.

Turning now to FIG. 3, there is illustrated an indirect feedback system 300 and its associated inputs and outputs. The indirect feedback tuning system 300 can comprise one of more of each of the following: a controller 302, comprising a processor or a processing unit 304, a memory 306, a thermal tuning driver component 308, an electrical tuning driver component 310, a sensing component 312, and a machine learning component 314.

According to an embodiment, the processing unit 304 can comprise a processor and a memory. According to another embodiment, the processing unit 304 and memory 306 are separate components/units.

The controller 302 can determine to use thermal tuning, or electrical tuning, or a combination of both thermal tuning and electrical tuning, based on models and/or feedback. Such a determination can be based on tuning speed, tuning accuracy, tuning range, tuning energy, tuning power, tuning circuit cost, or other suitable factors. It can be appreciated that the controller 302 can be similar to the controller 106.

The sensing component 312 can be utilized to receive an indirect feedback 316. The sensing component 312 can, for instance, determine a temperature of a photonic device, a corresponding environmental temperature associated with a photonic device, or a tuning circuit temperature associated with a photonic device.

The electrical tuning driver component 310 can facilitate electrical tuning 318. The electrical tuning driver component 310 can comprise a digital-to-analog converter and/or an amplifier. The electrical tuning driver component 310 can comprise circuits to facilitate electrical tuning, such as by carriers and/or electrical fields. Associated methods to control carriers can include carrier injection, carrier depletion, and/or carrier accumulation. Electrical tuning can be fast and energy efficient.

The thermal tuning driver component 308 can facilitate thermal tuning 320. Thermal tuning 320 can comprise a large tuning range. The thermal tuning driver component 308 can utilize a digital-to-analog converter and/or a pulse-width-modulation circuit. The thermal tuning driver component 308 can comprise a heater or a cooler, or can be communicatively coupled to a separate heater or a cooler. In this regard, the thermal tuning driver component 308 can adjust a temperature of an optical/photonic device via thermal tuning 320. It can be appreciated that thermal tuning can tune an optical/photonic device by adjusting its temperature, a corresponding environmental temperature, an associated tuning circuit temperature, or another element or area suitable for thermal tuning.

In various embodiments, a machine learning algorithm can be used (e.g., by a machine learning component 314) to facilitate indirect feedback tuning and/or associated photonic functions, such as thermal tuning, electrical tuning, photonic device modeling, MPC, or other suitable functions. In various cases, the machine learning algorithm can be trained (e.g., via supervised learning, unsupervised learning, reinforcement learning, and so on) to provide appropriate feedback to enable the lowest BER and/or lowest energy consumption, or to determine an appropriate balance between lowering BER and energy consumption (e.g., value tuning), or other suitable functions aided by machine learning. The machine learning component 314 can repeatedly determine thermal effects and a feedback model associated with an optical device (e.g., an optical device 102).

In various embodiments, a trained machine learning and/or pattern recognition algorithm can include any suitable mathematical, statistical, and/or computational classification technique. For instance, in various embodiments, a trained machine learning and/or pattern recognition algorithm can include any suitable mathematical, statistical, and/or computational technique that can be trained (e.g., via supervised learning on known data sets) to classify an input data set into one or more output classifications (e.g., to detect patterns and/or signatures in an input data set and to correlate the detected patterns and/or signatures to one or more states of the input data set). In various embodiments, a trained machine learning and/or pattern recognition algorithm can comprise one or more linear classifiers (e.g., generative classifiers such as Naïve Bayes, linear discriminant analysis, and so on; discriminative classifiers such as logistic regression, perceptron, support vector machines, and so on; linear affine transformations optimized to achieve global minima; and so on). In various embodiments, a trained machine learning and/or pattern recognition algorithm can comprise one or more non-linear classifiers (e.g., artificial neural networks, non-linear and/or high dimensional support vector machines, and so on).

To facilitate the above-described machine learning aspects of various embodiments of the subject claimed innovation, consider the following discussion of artificial intelligence. Various embodiments of the present innovation herein can employ artificial intelligence (AI) to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute, and so on) of the present innovation, components of the present innovation can examine the entirety or a subset of the data to which it is granted access and can provide for reasoning about or determine states of the system, environment, and so on from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, z=(z1, z2, z3, z4, zn), to a confidence that the input belongs to a class, as by f(z)=confidence(class). Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Figure 4:
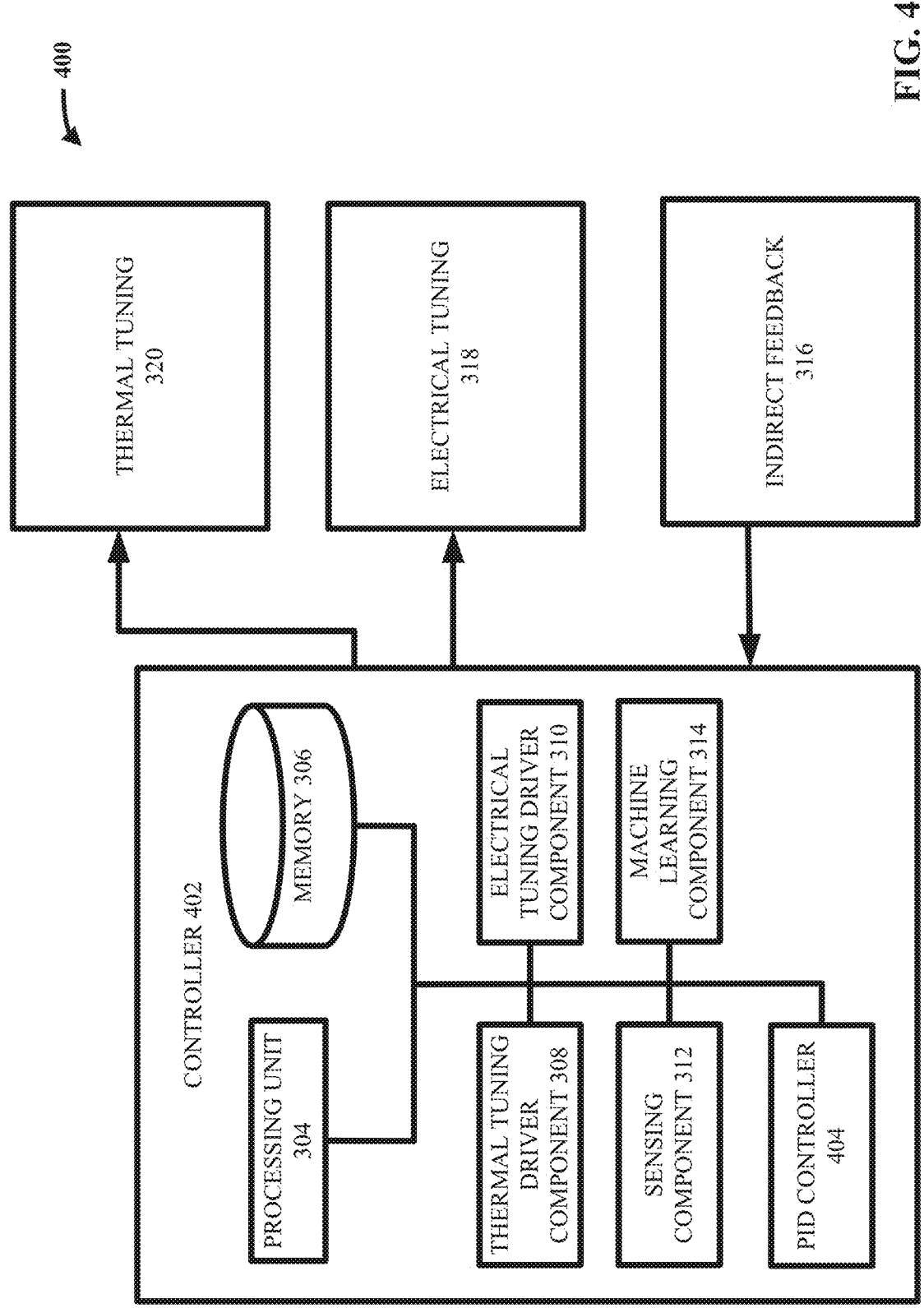
FIG. 4 illustrates a system in accordance with one or more embodiments described herein.

Turning now to FIG. 4, there is illustrated an indirect feedback system 400 and its associated inputs and outputs. The indirect feedback tuning system 400 can comprise one of more of each of the following: a controller 402, comprising a processor or a processing unit 304, a memory 306, a thermal tuning driver component 308, an electrical tuning driver component 310, a sensing component 312, a machine learning component 314, and a PID controller 404.

The PID controller 404 can utilize a proportioner (P term), an integrator (I term), a differentiator (D term), and/or an adder. (e.g., see FIG. 8). PID control function can be expressed as Equation (1) below. Hardware implementations of PID controllers comprise many variations. For instance, according to an embodiment, an integrator or the differentiator can be omitted to save hardware overhead. PI and PD controllers comprise other derivations. A standard form of the PID controller 404, as in Equation (1), can be discretized. The integral term can be replaced as follows:

$$K_i \int_0^{t_k} e(\tau)d\tau = \Sigma_0^k(t_i)\Delta t.$$

The derivative term can be replaced as $(e(t_k)-e(t_{k-1}))/\Delta t$. Such discretion can greatly reduce the logical synthesis area and can improve computation speed. The three operations can be analog, implemented by the resistance, capacitance, and operation amplifier (e.g., see FIG. 8). When the input and output comprise analog signals, such an analog PID controller 404 can avoid mixed signal issues and save the cost of analog-to-digital and digital-to-analog conversions.

$$u(t) = K_p e(t) + K_i \int_0^\tau e(\tau)d\tau + K_d \frac{de(t)}{dt} \quad \text{Equation (1)}$$

A PID controller 404 does not require direct knowledge of the tuning objective, and its performance can depend on the parameters of $K_p$, $K_i$, and $K_d$. An increase of $K_p$ and $K_i$ can add the settling time, causing overshoot and degrading the stability. A larger $K_p$ can cause steady-state error, while $K_i$ can eliminate the error. $K_d$ does not affect such error and contributes to a decrease of overshoot. But, it worsen system stability when it is large. PID control targets a linear system in which, the system output of the linear combination of inputs is equal to the same linear combination of outputs. However, a thermal tuning system can comprise a classical nonlinear system because the passive cooling rate can be much slower than the active heating rate. So, the overshoot temperature cannot be forced downward. The cooling and heating rate can depend on current temperature. Furthermore, the initial process in a nonlinear system causes the oscillation of the system.

Model Predictive Control (MPC) can rely on dynamic models of the control objective, most typically the empirical model. It can be appreciated that a controller (e.g., a controller 402) can use or facilitate such MPC. MPC can use this internal model to predict the future feedback signal and calculate optimal feedback or changes. A controller leveraging MPC (e.g., a controller 402) can also record a to a memory 306 history of past control moves to adjust the dynamic model. Such history can comprise historical tuning information associated with an optical device (e.g., an optical device 102). Hence, empirical knowledge of the control objective can be important. According to an embodiment, empirical curves or test curves can be stored in a look-up table quantitatively to save calculation time and logic synthesis area. According to an embodiment, controllers described herein (e.g., a controller 402 or other controllers described herein) can comprise an MPC-type controller.

It can be appreciated that a controller 402 (or other controllers described herein such as a controller 106, 302, or another controller later discussed) can facilitate indirect feedback tuning as disclosed herein. In indirect feedback tuning, process variation information of an optical switch (e.g., an optical device 102) can be extracted in a package test stage. This can help correct an ideal theoretical model, as will be later discussed in greater detail. Environmental temperature fluctuation (e.g., indirect feedback 316) can be monitored by a temperature sensor (e.g., sensing component 312). Temperature information can be provided to an MPC-type controller (e.g., a controller 402 or another suitable controller). According to an embodiment, the controller 402 can comprise a prediction model stored thereon (e.g., om a memory 306) and a PID controller 404. A process variation model can predict a switch and no-thermal-tuning temperature based on current temperature and heater power. A process variation model can alternatively/additionally predict a device and/or an environment surrounding the device, based on temperature (of the device or the environment), a power level of a heater, or historical tuning information. This model can set the targeted temperature for the PID controller 404 and the digital-to-analog conversion value for electrical tuning 318. Because tuning temperature can be linear to the heater power, it can directly reduce the complexity of the non-linear process of the receiving power. Prediction of no-thermal-tuning temperature avoids overheating. Temperature prediction can be based on a thermal model of a microring switch instead as opposed to an overheating threshold.

Circuit designs as described herein can consider both performance and overhead. The controller (e.g., a controller 106, 302, 402, or another suitable controller) can use the discrete implementation in Equation (2) below:

$$u(t_k)=u(t_{k-1})+K_c(et(t_k)-et(t_{k-1}))+K_iet(t_k)+K_d(et(t_k)-2et(t_{k-1})+et(t_{k-2}))$$

Equation (2)

The temperature sensor (e.g., sensing component 312) can be based on a temperature sensitive integrated circuit, and the amplified temperature voltage can be further sampled by a successive approximation analog-to-digital converter (SAR ADC) (e.g., an electrical tuning driver component 310). Such a temperature sensor can utilize a temperature drift property of a microelectronic device, and can comprise a Metal Oxide Silicon Field Effect Transistor or a Metal Oxide Semiconductor Field Effect Transistor (MOSFET). In thermal tuning 320, a heater can be driven by an associated PWM signal.

Figure 5:
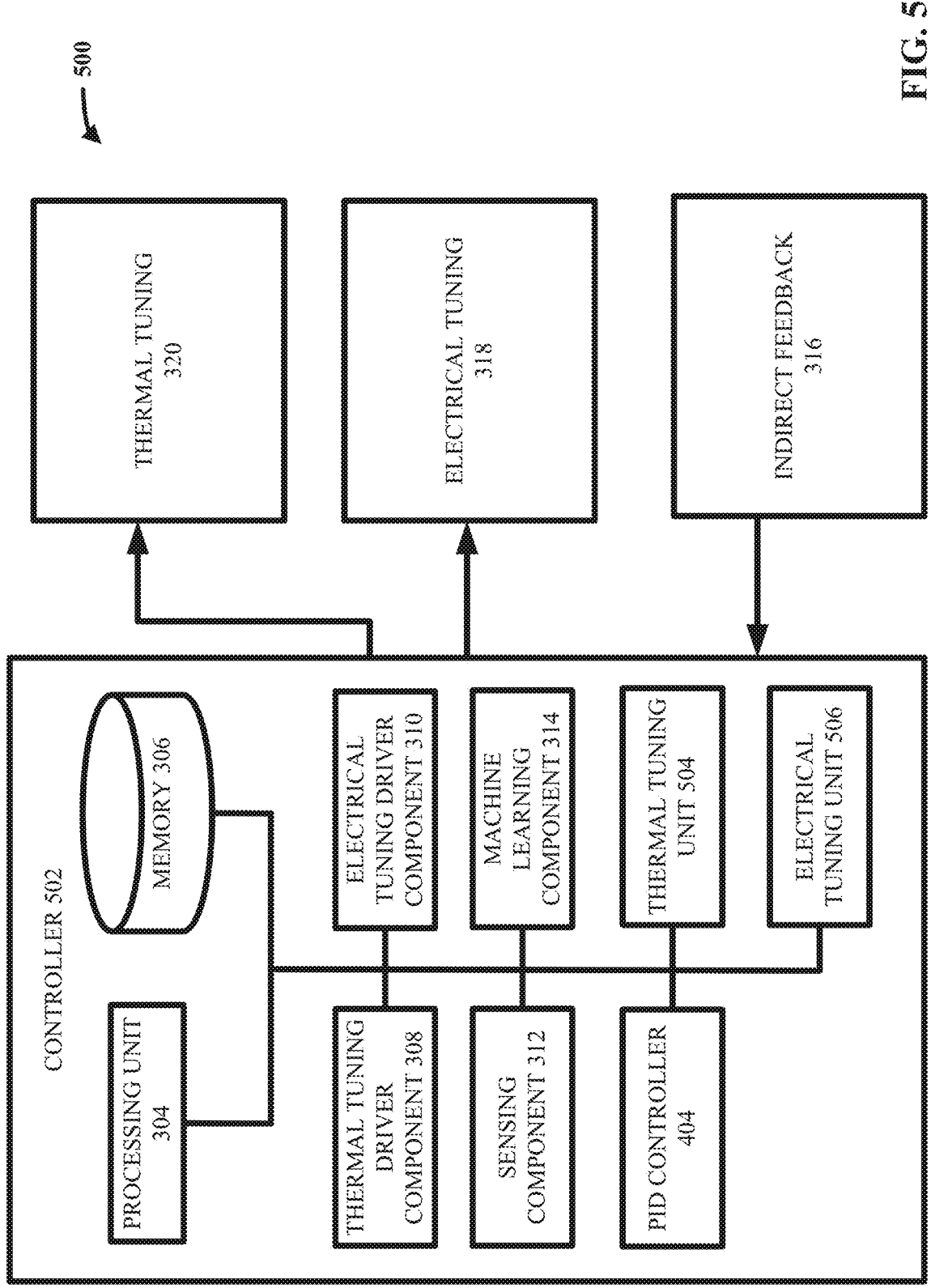
FIG. 5 illustrates a system in accordance with one or more embodiments described herein.

Turning now to FIG. 5, there is illustrated an indirect feedback system 500 and its associated inputs and outputs. The indirect feedback tuning system 500 can comprise one of more of each of the following: a controller 502, comprising a processor or a processing unit 304, a memory 306, a thermal tuning driver component 308, an electrical tuning driver component 310, a sensing component 312, a machine learning component 314, and a PID controller 404.

Controller 502 can additionally comprise one or more of a thermal tuning unit 504. The thermal tuning unit 504 can comprise a heater or a cooler, which can drive thermal tuning 320. In this regard, the thermal tuning unit 504 can adjust a temperature of an optical device (e.g., an optical device 102). It can be appreciated that thermal tuning unit 504 can tune an optical device (e.g., an optical device 102) by adjusting its temperature, a corresponding environmental temperature, or an associated tuning circuit temperature.

Controller 502 can additionally comprise one or more of an electrical tuning unit 506. An electrical tuning unit 506 can drive electrical tuning 318, and can tune an optical device (e.g., an optical device 102) by carriers and/or electrical fields. Associated methods to control carriers can include carrier injection, carrier depletion, and/or carrier accumulation. It can be appreciated that the electrical tuning unit 506 can tune a voltage or a current of an optical device 102 via electrical tuning 318.

Figure 6:
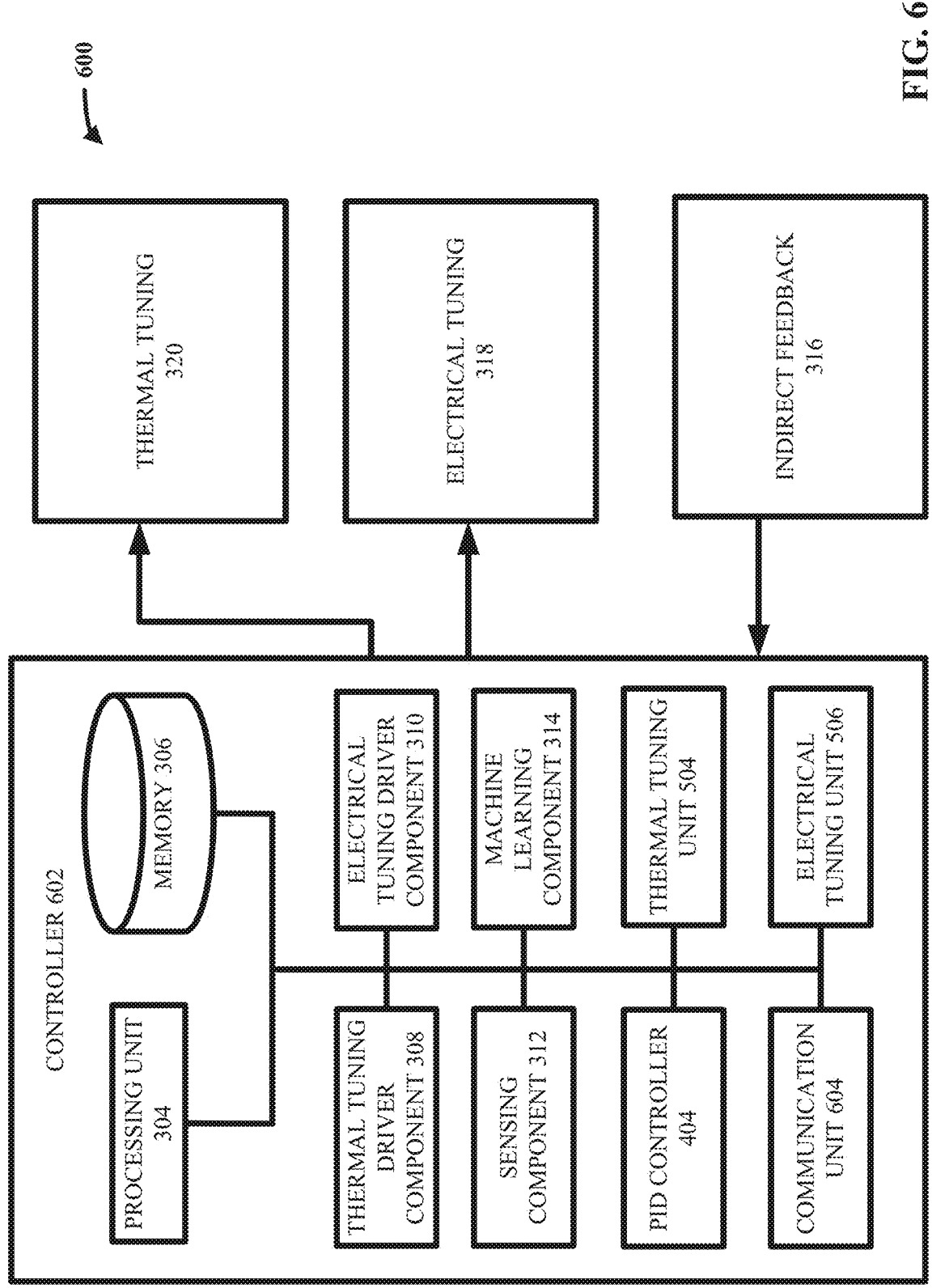
FIG. 6 illustrates a system in accordance with one or more embodiments described herein.

With reference to FIG. 6, there is illustrated an indirect feedback system 600 and its associated inputs and outputs. The indirect feedback tuning system 500 can comprise one of more of each of the following: a controller 502, comprising a processor or a processing unit 304, a memory 306, a thermal tuning driver component 308, an electrical tuning driver component 310, a sensing component 312, a machine learning component 314, a PID controller 404, thermal tuning unit 504, electrical tuning unit 506, and a communication unit 604.

According to an embodiment, the communication unit 604 can, for instance, communicate to second or another controller. According to yet another embodiment, the communication unit 604 can be utilized to communicatively couple the controller 602 to a silicon photonic network (e.g., a silicon photonic network 202). Communication unit 604 can leverage, for instance, wireless communication such as Wi-Fi, Bluetooth, telecommunication signals (e.g., 5G mmWave, sub-6, LTE, GSM, CDMA, or other suitable telecommunication protocols), or wired communication such as fiber optic, copper, or other suitable wired connections. The communication unit 604 can facilitate, for instance, failure reporting or status monitoring of a controller 602 or an associated optical device.

Figure 7:
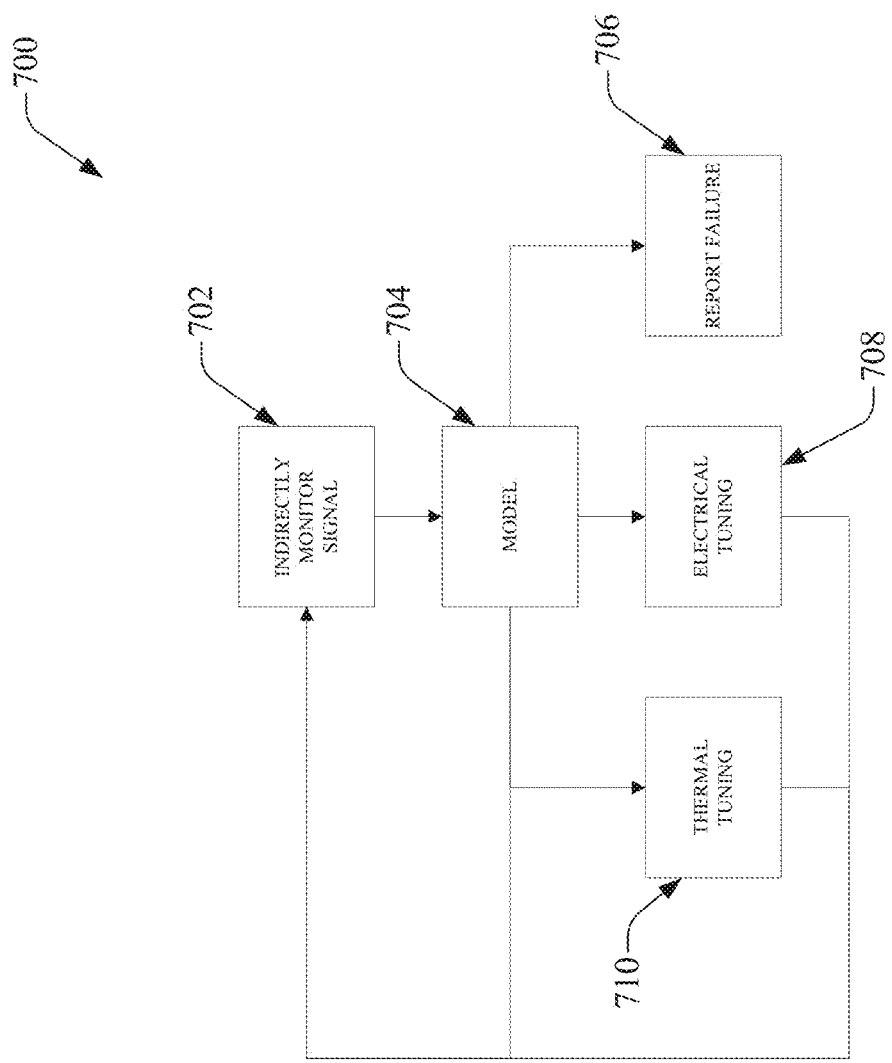
FIG. 7 illustrates an exemplary system logic in accordance with one or more embodiments described herein.

With reference to FIG. 7, there is illustrated a nonlimiting example of a control logic 700 of a model-based controller (e.g., a controller 106, a controller 302, 402, 502, 602, or another suitable controller). The control logic 700 can comprise, at 702, indirectly monitoring a signal. In this regard, indirect signal monitoring can comprise portless monitoring. At 704, the signal can be compared to a model associated with the signal. The model can comprise known operations of optical device across various conditions. Other embodiments can leverage machine learning at 704 to generate accurate models in association with various conditions. An observation taken by indirectly monitoring (e.g., portless) a signal (e.g., with a sensing component 312 or an indirect feedback sensor 104) can be compared to the model associated with that signal or a corresponding optical device. The model an additionally comprise a model of an environment associated with a corresponding optical device (e.g., a switch housing, network switch stack, a room in which the optical device is located, or another suitable environment to model), or tuning circuits associated with a corresponding optical device. The model can account for thermal and/or process (e.g., manufacturing) variations. The model can consider a sampling rate and sampling accuracy from a sensor, a tuning speed or tuning accuracy, to effectively combine thermal and electrical tuning. Based on such a comparison, thermal tuning can be conducted at 710 if thermal tuning is determined to be necessary. Electrical tuning can be conducted at 708 if electrical tuning is determined to be necessary. If a failure or error occurs (e.g., in monitoring the signal or in a comparison to the model), an associated failure can be reported at 706. Failure can be reported to, for example, an upper-level controller such as a network controller (e.g., on a network 202) or a system controller communicatively coupled to a network 202.

Figure 8:
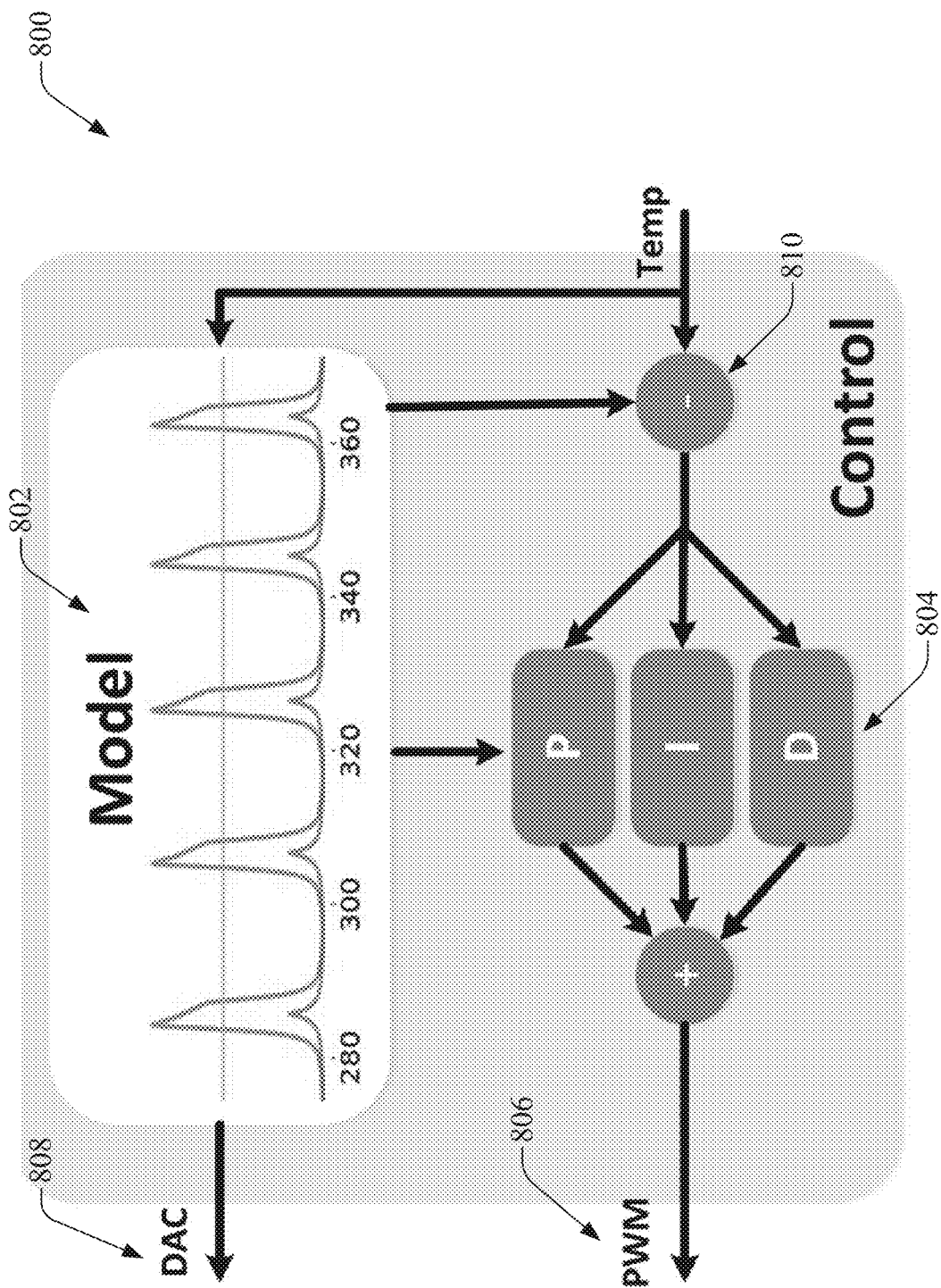
FIG. 8 illustrates an exemplary system logic in accordance with one or more embodiments described herein.

Turning now to FIG. 8, there is illustrated a nonlimiting example of a control logic 800 of a model-based controller (e.g., a controller 106, a controller 302, 402, 502, 602, or another suitable controller). PID logic 804 can receive a signal 810 which can be utilized to generate a PWM signal 806. Such a PWM signal 806 can drive a heater which can alter a temperature of an optical device (e.g., an optical device 102). A model (as will be later discussed in greater detail) such as a model 802, can be utilized in the PID logic 804 for temperature control. Model 802 can also be utilized in digital to analog conversion 808. In this regard, it can be appreciated that circuit implementation of control logic 800 can comprise a temperature sensor (e.g., indirect feedback sensor 104), MPC controller (e.g., controller 106), PWM 806 for thermal tuning and DAC 808 for electrical tuning.

Figure 9:
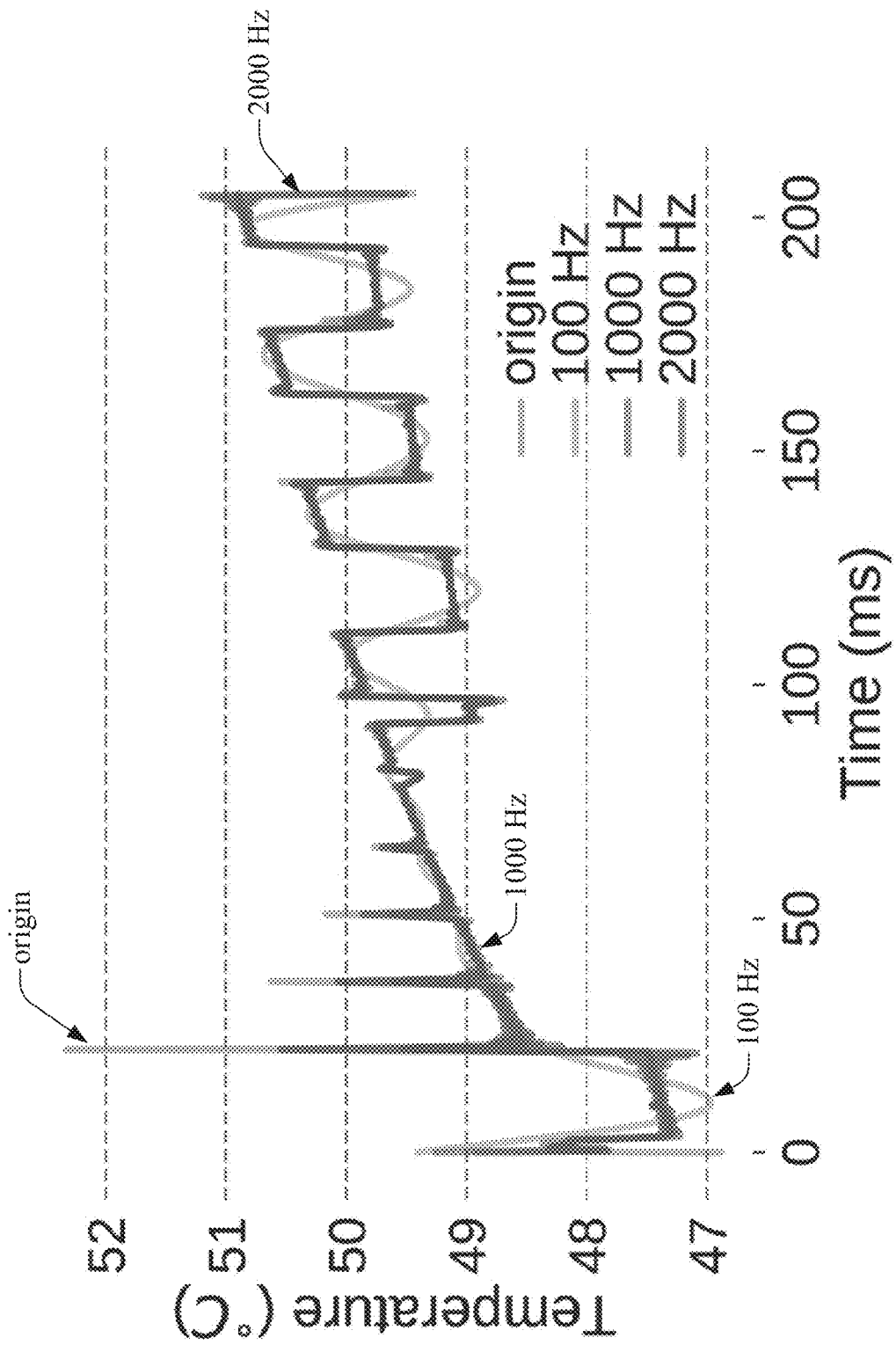
FIG. 9 is a chart of an original signal and reconstructed signals in accordance with one or more embodiments described herein.

Next, sampling and tuning in accordance with various embodiments described herein are further discussed. A sampling rate can be given by an input signal. For optical power feedback tuning, the optical power of the data signal can be sampled by an optical receiver in every bit so that the sampling rate can be determined by the bit rate. BER feedback tuning can slower, and its rate can be decided by a BER requirement. According to the Nyquist sampling theorem, the waveform should be sampled over twice as fast as its highest frequency component. Furthermore, the highest frequency component can be determined by the precision and sensing range of the temperature sensor. When the temperature sensor (e.g., indirect feedback sensor 104) operates from about 0° C. to about 100° C., resolution of the 12-bit temperature sensor can be around 0.025° C. The highest frequency component detected by such a 12-bit temperature sensor can be around 1000 Hz (see, e.g., FIG. 9). Most of effective frequency components (whose magnitude is larger than 0.025° C.) are lower than 1000 Hz. So, according to an embodiment, the Nyquist sampling rate is no more than 2000 Hz.

Next, various models in accordance with various embodiments described herein will be discussed and enabled:

First, a process variation model is enabled. Process variation occurs from inherent variations resulting from the fabrication process steps and can affects many device parameters. For example, thermal oxidation or deposition may introduce cladding thickness variation. Masking, exposition, and etching can affect planar geometry size. Specifically, the line width of metals, polymers, and waveguides, the gap of the grating coupler or directional coupler, and the curve of the ring can all be influential. Moreover, for exposition, using a positive photoresist or negative photoresist also contributes to the process variation. The etching process can affect the surface roughness of the waveguide, and when using plasma etching, the angle of the plasma etching process determines the tilt rate of the optical waveguide. The doping and annealing process can cause variations in carrier density and distribution. The properties of optical components are more sensitive to their geometry, compared to electrical components.

The process variations can be further separated into inter-die variation and intra-die variation. Intra-die variation is highly related to the X-Y position of each device in a chipset. Width and film thickness variation models can be evaluated. Because width variation and gap variation can be caused by the masking, exposition, and etching, but with different effects due to the photoresist, it can be assumed that the gap variation map can be inversely proportional to the width variation. The passing loss can be affected by the surface roughness and material absorption.

After obtaining the material-level parameter variations, the photonic component features can be extracted with Monte Carlo simulation using a device simulator (e.g., BOSIM). It can be appreciated that a feedback model can be associated with a photonic device, which can be extracted from an accurate simulator. Many stochastic properties at a circuit level might not be consistent with those at the material level. Significantly, these circuit level parameters can disobey the commonly assumed Gaussian distributions. Also, circuit level parameters can depend on the X-Y locations.

Next, a thermal variation model is enabled. Thermal variation can be caused by runtime heat consumption and environmental temperature fluctuation. Compared to ~K scale environmental temperature fluctuation in one day, the runtime heat consumption, typically at ~10K scale within a few minutes, can dominate the thermal variation analyses. In a multicore system using a silicon photonic network, the processing core can contribute the most heat. The runtime thermal map can vary in different benchmarks, architectures, and clock cycles. First, computation-intensive benchmarks distribute tasks equally into most of the processing cores. Therefore, after initialization, more cores can "wake up" to heat the chip. Global temperatures can continue to rise before a computing process is finished. Second, local temperatures of the chips may not be even because workload is not always mapped into all the cores, and all the active cores may not finish tasks at the same time.

Next, a device model is enabled. The thermal heater can be a key component in thermal tuning. Power-related heater efficiency and time-related heater delay can be two important evaluation metrics with respect to a device model. Classified by material, there are metal heaters, polysilicon heaters, silicon heaters, or other suitable heaters. Classified by position, there are top heaters (e.g., waveguide heaters), substrate heaters, embedded heaters, or other suitable heaters. The differences in materials and positions affect the thermal diffusion, the thermal resistance, the thermal capacitance, and the device temperature map. Equation (3) below shows a thermal model based on a differential heat equation:

$$\frac{\partial u}{\partial t} = \alpha \nabla^2 u + f \qquad \text{Equation (3)}$$

$$u = u_D \text{ in } \Omega,$$
$$u = u_0 \text{ at } t = 0$$

α is the thermal diffusivity, and f is the heat source. More specifically, $$\alpha = \frac{k}{c_p} \rho$$

and k is thermal conductivity. $c_p$ is the heat capacity, and ρ is the density. α is different in each layer. $u_D$ is the boundary condition, and $u_0$ is the initial situation. Equation (4) provides the circuit level variant of Equation (3).

$$C_{th} \frac{dT(t)}{dt} + \frac{T_1 - T_2}{R_{th}} = Q \qquad \text{Equation (4)}$$

$C_{th}=\rho c_p V$ is the thermal capacitance or thermal mass, V is the volume of the material, T is the temperature and $R_{th}$ is the thermal capacitance.

Next, feedback in accordance with embodiments herein is discussed. Feedback signals can be separated into two categories based on their source: direct feedback signals and indirect feedback signals. Since it is desired for optical signals to be stable, avoiding variations, the direct feedback signal can be the receiving power. The vulnerable receiving power affects the network quality so that the network evaluation metrics can be indirect feedback signals, such as the BER and 1/0 bit statistics. Moreover, unstable optical power can be caused by the temperature drift and/or process shift of photonic devices. The process shift can be determined as soon as the fabrication is completed. The runtime temperature variations can be detected by the temperature sensor. Together with an accurate model, the receiving optical power can be obtained from the temperature data. Thus, the temperature can be an indirect feedback signal as well.

A temperature sensor can monitor the local environment temperature on the chip. If the relationship between temperature and optical power is available, optical power can be determined with the detected temperature. Due to the process variation, the $P_{drop}/P_{in}$ curves may be shifted or deformed.

The adoption of temperature feedback has several advantages. First, the temperature fluctuation can be the only source of thermal variation. Temperature feedback can be directly related to a stable thermal environment. Second, in the limited temperature precision, the temperature change can be significantly slower than the speed of an optical signal. So, the sampling frequency of the feedback signal can be lower, contributing to a lower hardware cost. Third, compared to a feedback optical signal, this indirect feedback signal does not occupy the port of the switch so it can be applied in more complex network topologies. Fourth, the temperature sensor saves more energy and area than the receiver circuit involving a transimpedance amplifier (TIA).

Next, tuning methods in accordance with embodiments herein are discussed. The adjustments to compensate for variations can target many components in the link. In the source, laser power and channel wavelength can be modified to compensate for the signal attenuation variation and wavelength shift. In the destination, gain of the TIA can be controlled. On the switch side, the optical switch can be tuned by a thermal heater or bias voltage. The following are implementations and features of different tuning methods:

(1) Electrical tuning (e.g., electrical tuning 318, electrical tuning 708, as facilitated by electrical tuning driver 112, electrical tuning unit 114, electrical tuning driver component 310, or electrical tuning unit 506): When the bias voltage Vic of the optical switch increases and more carriers are injected into the phase shifter, the transmission spectrum has a blue-shift (e.g., a left shift or decrease in wavelength) with the shape deformation. The biasing circuit can be implemented in many ways. For instance, the biasing can be added into a DAC (digital-to-analog converter) as a digital offset. The offset value can be determined after the control logic. Analog biasing solutions are also available, such by feeding back more DC current and adjusting the DC operating point in the amplifier-based biasing circuit.

Another type of electrical tuning is to tune the peak-peak voltage $V_{pp}$ of the dynamic signal. It can be appreciated that, a larger $V_{pp}$ causes a larger wavelength shift from $V_{min}$ to $V_{max}$, so that a temperature channel width of an on-state increases. This can increase temperature tolerance. The analog adjustment of $V_{pp}$ often involves an amplifier by changing its gain of an AC signal. Through the digital-to-analog conversion, the number difference of $V_{min}$ and $V_{max}$ can be set.

Electrical tuning is fast and energy-efficient, compared to thermal tuning. Its tuning range, however, is limited. For instance, electrical tuning can only compensate for limited temperature of less than 5° C.

(2) Thermal tuning (e.g., thermal tuning 320, thermal tuning 710, as facilitated by thermal tuning driver 108, thermal tuning unit 110, thermal tuning driver component 308, or thermal tuning unit 504): The thermal heater can dominate the tuning of temperature. For the cooling process, the heater sink and active cooling system cannot dissipate heat locally in ~100 µm² scale. So, the heater sink and active cooling system are more often used to reduce global temperature and increase the global cooling rate. For the heating process, an on-chip thermal heater can be adopted. When the electric current passes a conductor or semiconductor, it produces Joule heating or resistive heating. This kind of heat can be utilized for thermal tuning. Targeting at control, the heater efficiency and delay are a concern. The driving circuit of the heater can be simpler as compared to DAC or amplifier-involved electrical tuning. Since the temperature change can be much slower than the system clock frequency, and the heat process is not sensitive to high-frequency electrical noise, the PWM signal can be adopted, which can be produced by a digital timer. The delay can be considerable, around µs/° C. depending on the temperature. Thermal tuning can achieve a high tuning range but have low responsivity and cost more energy, compared to electrical tuning.

Figure 10:
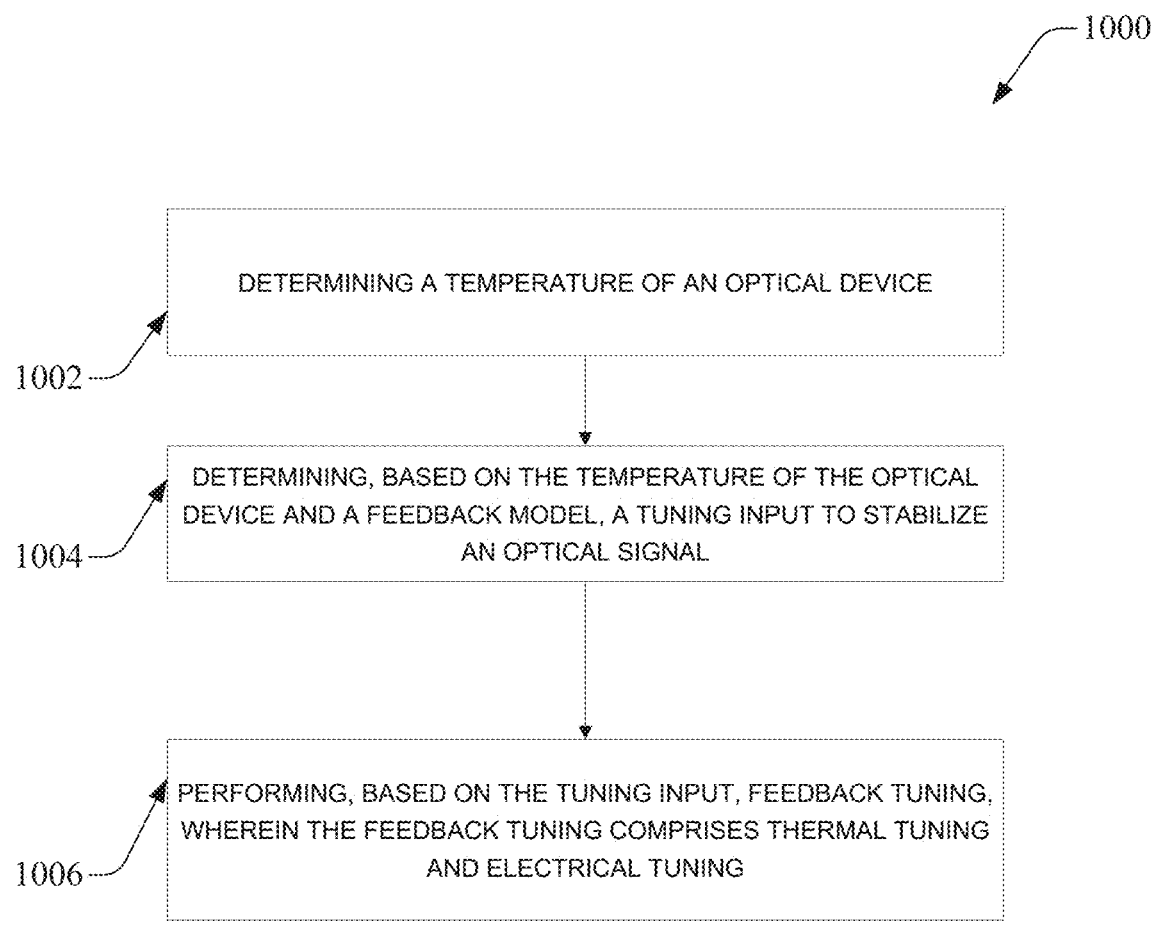
FIG. 10 is a block flow diagram for tuning a photonic device in accordance with one or more embodiments described herein.

FIG. 10 is a flow diagram of a process 1000 for indirect feedback tuning in accordance with one or more embodiments described herein. At 1002, a temperature of an optical device is determined. At 1004, a tuning input to stabilize an optical signal is determined based on the temperature of the optical device and a feedback model. At 1006, feedback tuning is performed, based on the tuning input, wherein the feedback tuning comprises thermal tuning and electrical tuning.

Figure 11:
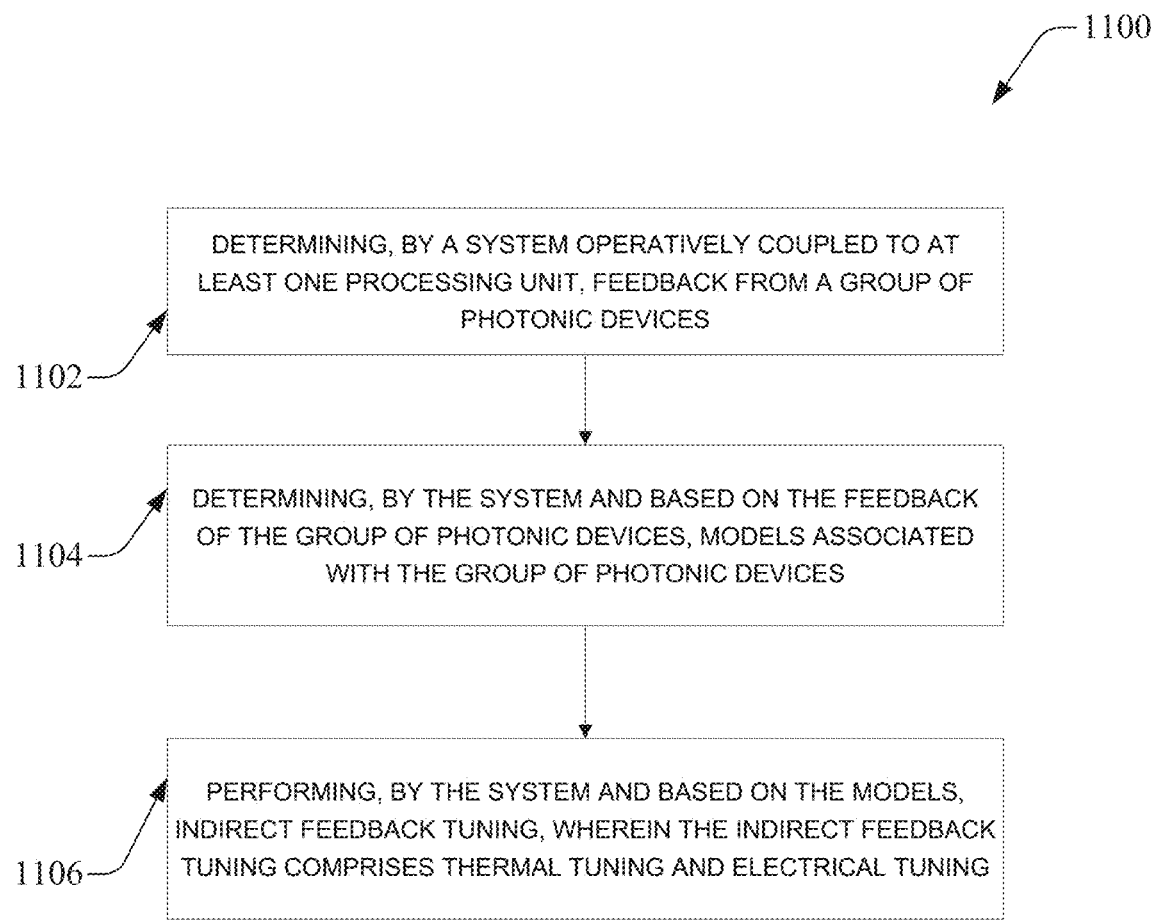
FIG. 11 is a block flow diagram for tuning a photonic device in accordance with one or more embodiments described herein.

FIG. 11 is a flow diagram of a process 1100 for indirect feedback tuning in accordance with one or more embodiments described herein. At 1102, feedback from a group of photonic devices is determined by a system operatively coupled to at least one processing unit. At 1104, models associated with the group of photonic devices determined, based on the feedback of the group of photonic devices. At 1106, indirect feedback tuning is performed by the system and based on the models, wherein the indirect feedback tuning comprises thermal tuning and electrical tuning.

Figure 12:
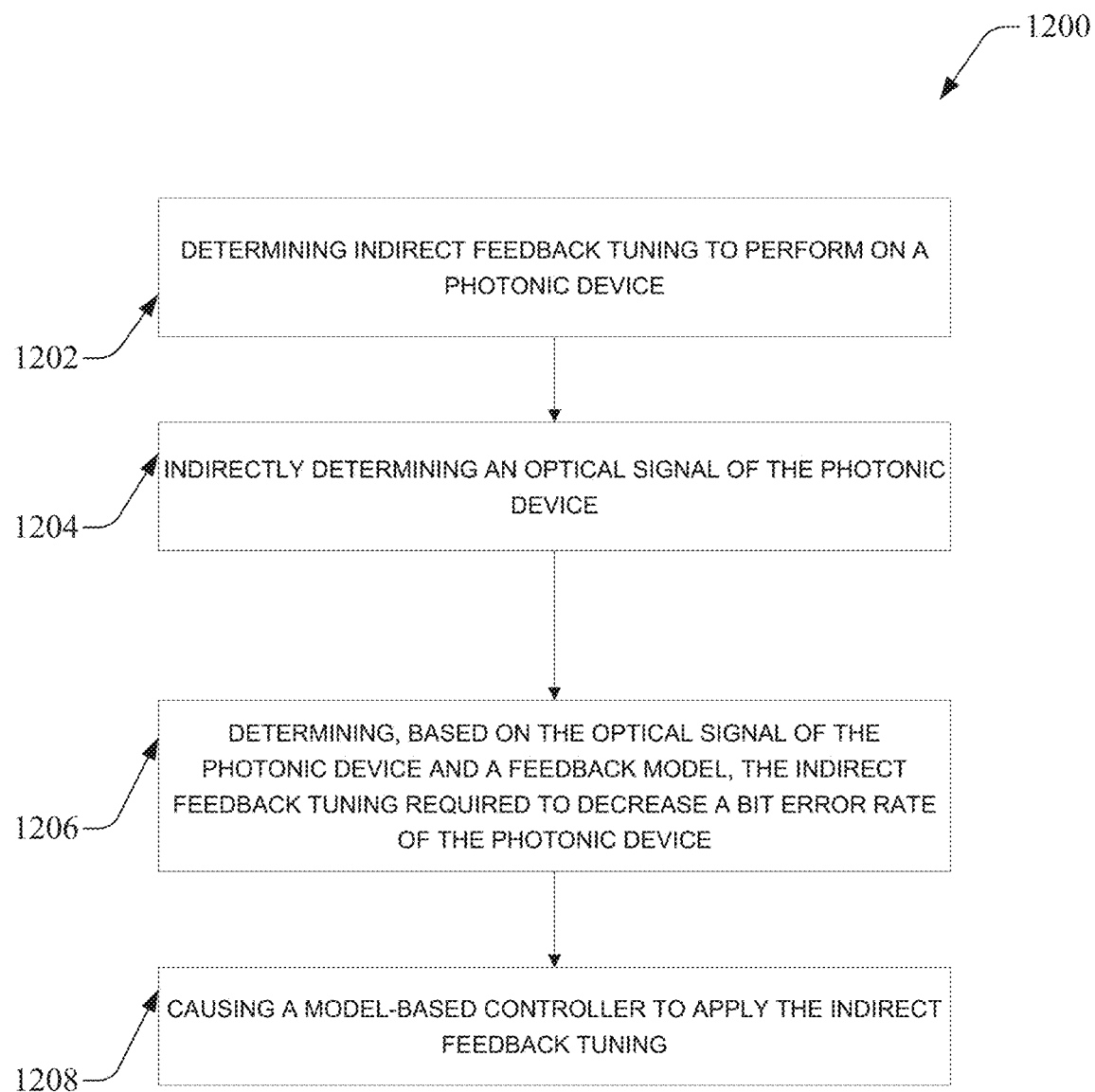
FIG. 12 is a block flow diagram for tuning a photonic device in accordance with one or more embodiments described herein.

FIG. 12 is a flow diagram of a process 1200 for indirect feedback tuning in accordance with one or more embodiments described herein. At 1202, indirect feedback tuning to perform on a photonic device is determined. At 1204, an optical signal (or a temperature) of the photonic switch is indirectly determined. At 1206, indirect feedback tuning required to decrease a bit error rate of the photonic device are determined, based on the optical signal (or the temperature) of the optical device and a feedback model. At 1208, a model-based controller is caused to apply the indirect feedback tuning.

FIGS. 10-12 illustrate respective methods or systems in accordance with certain aspects of this disclosure. While, for purposes of simplicity of explanation, the methods or systems are shown and described as a series of acts, it is to be understood and appreciated that this disclosure is not limited by the order of acts, as some acts may occur in different orders and/or concurrently with other acts from those shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

One or more embodiments can be a system, a method, and/or a computer program product at any possible technical detail level of integration. The computer program product can include a computer readable storage medium (or media) having computer readable program instructions thereon for causing a processor or a processing unit to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 13, the systems and processes described below can be embodied within hardware, such as a single integrated circuit (IC) chip, multiple ICs, an application specific integrated circuit (ASIC), a customized circuit block, or the like. Further, the order in which some or all of the process blocks appear in each process should not be deemed limiting. Rather, it should be understood that some of the process blocks can be executed in a variety of orders, not all of which can be explicitly illustrated herein.

Figure 13:
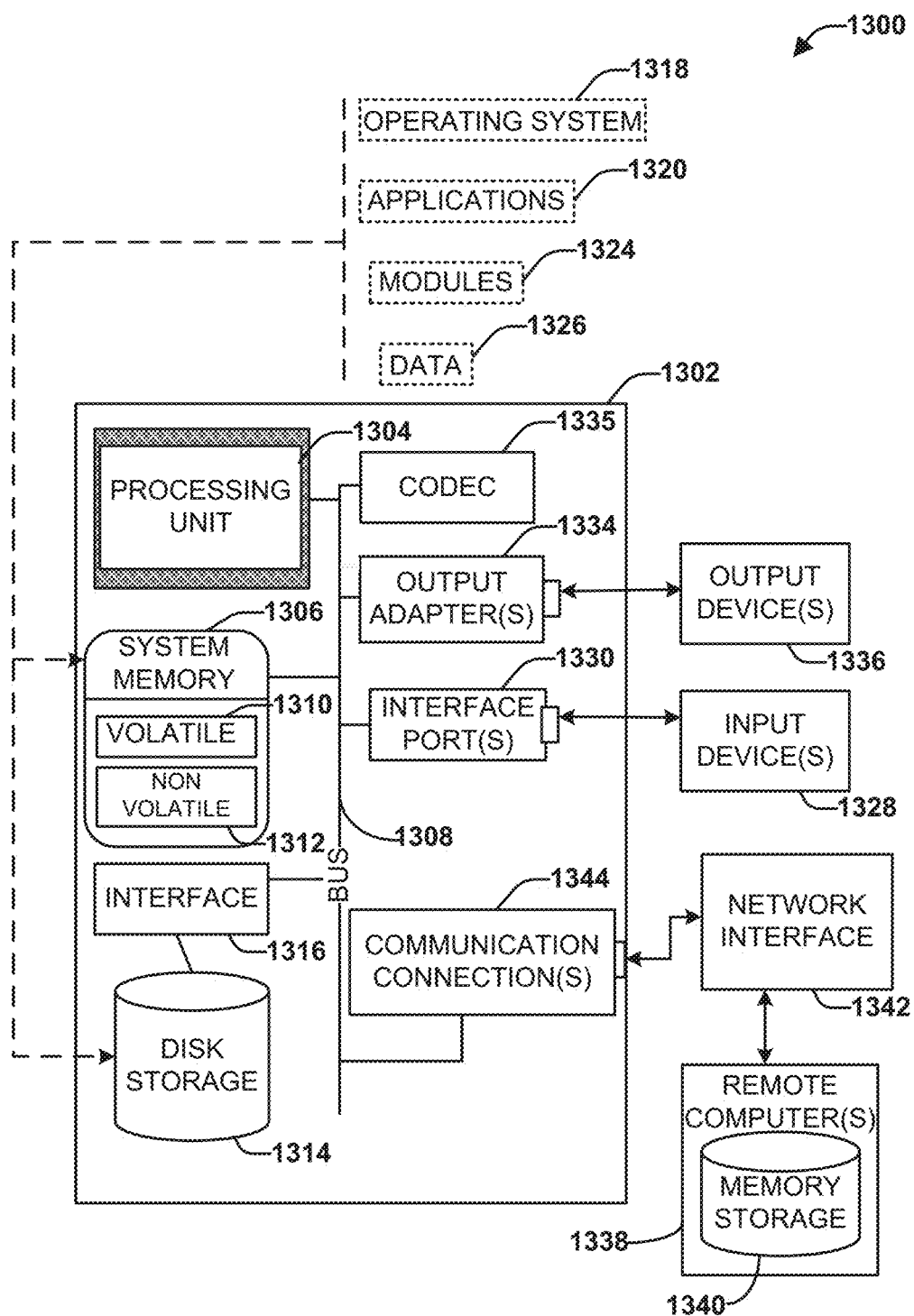
FIG. 13 illustrates a block diagram of an example, non-limiting operating environment in which one or more embodiments described herein can be facilitated.

With reference to FIG. 13, an example environment 1300 for implementing various aspects of the claimed subject matter includes a computer 1302. The computer 1302 includes a processing unit 1304, a system memory 1306, a codec 1335, and a system bus 1308. The system bus 1308 couples system components including, but not limited to, the system memory 1306 to the processing unit 1304. The processing unit 1304 can be any of various available processors. Dual microprocessors and other multiprocessor architectures also can be employed as the processing unit 1304.

The system bus 1308 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1306 includes volatile memory 1310 and non-volatile memory 1312, which can employ one or more of the disclosed memory architectures, in various embodiments. The basic input/output system (BIOS), containing the basic routines to transfer information between elements within the computer 1302, such as during start-up, is stored in non-volatile memory 1312. In addition, according to present innovations, codec 1335 can include at least one of an encoder or decoder, wherein the at least one of an encoder or decoder can consist of hardware, software, or a combination of hardware and software. Although, codec 1335 is depicted as a separate component, codec 1335 can be contained within non-volatile memory 1312. By way of illustration, and not limitation, non-volatile memory 1312 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1312 can employ one or more of the disclosed memory devices, in at least some embodiments. Moreover, non-volatile memory 1312 can be computer memory (e.g., physically integrated with computer 1302 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1310 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1302 can also include removable/non-removable, volatile/non-volatile computer storage medium. FIG. 13 illustrates, for example, disk storage 1314. Disk storage 1314 includes, but is not limited to, devices like a magnetic disk drive, solid state disk (SSD), flash memory card, or memory stick. In addition, disk storage 1314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1314 to the system bus 1308, a removable or non-removable interface is typically used, such as interface 1316. It is appreciated that disk storage 1314 can store information related to a user. Such information might be stored at or provided to a server or to an application running on a user device. In one embodiment, the user can be notified (e.g., by way of output device(s) 1336) of the types of information that are stored to disk storage 1314 or transmitted to the server or application. The user can be provided the opportunity to opt-in or opt-out of having such information collected or shared with the server or application (e.g., by way of input from input device(s) 1328).

It is to be appreciated that FIG. 13 describes software that acts as an intermediary between users and the basic computer resources described in the suitable operating environment 1300. Such software includes an operating system 1318. Operating system 1318, which can be stored on disk storage 1314, acts to control and allocate resources of the computer 1302. Applications 1320 take advantage of the management of resources by operating system 1318 through program modules 1324, and program data 1326, such as the boot/shutdown transaction table and the like, stored either in system memory 1306 or on disk storage 1314. It is to be appreciated that the claimed subject matter can be implemented with various operating systems or combinations of operating systems.

A user enters commands or information into the computer 1302 through input device(s) 1328. Input devices 1328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1304 through the system bus 1308 via interface port(s) 1330. Interface port(s) 1330 include, for example, a serial port, a parallel port, a game port, and a universal serial bus (USB). Output device(s) 1336 use some of the same type of ports as input device(s) 1328. Thus, for example, a USB port can be used to provide input to computer 1302 and to output information from computer 1302 to an output device 1336. Output adapter 1334 is provided to illustrate that there are some output devices 1336 like monitors, speakers, and printers, among other output devices 1336, which require special adapters. The output adapters 1334 include, by way of illustration and not limitation, video and sound cards that provide a means of connection between the output device 1336 and the system bus 1308. It should be noted that other devices or systems of devices provide both input and output capabilities such as remote computer(s) 1338.

Computer 1302 can operate in a networked environment using logical connections to one or more remote computers, such as remote computer(s) 1338. The remote computer(s) 1338 can be a personal computer, a server, a router, a network PC, a workstation, a microprocessor based appliance, a peer device, a smart phone, a tablet, or other network node, and typically includes many of the elements described relative to computer 1302. For purposes of brevity, only a memory storage device 1340 is illustrated with remote computer(s) 1338. Remote computer(s) 1338 is logically connected to computer 1302 through a network interface 1342 and then connected via communication connection(s) 1344. Network interface 1342 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1344 refers to the hardware/software employed to connect the network interface 1342 to the bus 1308. While communication connection 1344 is shown for illustrative clarity inside computer 1302, it can also be external to computer 1302. The hardware/software necessary for connection to the network interface 1342 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor or a processing unit, a processor, a processing unit, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system comprising,
   a processing unit that executes executable instructions to facilitate performance of operations, comprising:
   determining a temperature of an optical device;
   determining, based on the temperature of the optical device and a feedback model, a tuning input to stabilize an optical signal; and
   performing, based on the tuning input, feedback tuning, wherein the feedback tuning comprises thermal tuning and electrical tuning.

2. The system of claim 1, wherein performing the thermal tuning comprises performing the thermal tuning with a pulse-width modulation circuit, a digital-to-analog conversion circuit, or a gain-tunable amplifier.

3. The system of claim 1, wherein performing the electrical tuning comprises performing the electrical tuning with a digital-to-analog conversion circuit or a gain-tunable amplifier.

4. The system of claim 1, wherein determining the electrical tuning comprising tuning a voltage or a current of the optical device.

5. The system of claim 1, wherein the feedback model is based on historical tuning information associated with the optical device.

6. The system of claim 1, wherein determining the tuning input comprises using machine learning to dynamically determine thermal effects and the feedback model, and wherein the feedback model is associated with the optical device.

7. The system of claim 1, wherein determining the temperature of the optical device is based on a temperature sensitive integrated circuit.

8. The system of claim 1, wherein the operations further comprise:
   determining predictions of a device and a surrounding environment of the device based on the temperature, a power level of a heater, or historical tuning information.

9. The system of claim 8, wherein the predictions are further based on the feedback model, wherein the feedback model comprises a thermal model and an electrical model of the optical device, and wherein the optical device comprises a microresonator or a Mach-Zehnder Interferometer, and wherein the microresonator comprises a microring resonator or a microdisk resonator.

10. The system of claim 1, wherein the system is: communicatively coupled to a photonic network, computationally coupled to a photonic processing system, or coupled to a hybrid photonic and electronic system.

11. A method, comprising:
determining, by a system operatively coupled to at least one processing unit, feedback from a group of photonic devices;
determining, by the system and based on the feedback of the group of photonic devices, models associated with the group of photonic devices; and
performing, by the system and based on the models, indirect feedback tuning, wherein the indirect feedback tuning comprises thermal tuning and electrical tuning.

12. The method of claim 11, wherein the group of photonic devices comprises a photonic modulator, a photonic switch, or a photonic filter, and wherein determining the feedback does not utilize a port of a photonic device of the group of photonic devices.

13. The method of claim 11, further comprising quantitatively storing, by the system, empirical or test curves of predicted future feedback tuning or current feedback tuning.

14. The method of claim 11, wherein the system is communicatively coupled to: a photonic network, a photonic processing system, or a hybrid photonic and electronic system.

15. The method of claim 11, wherein the models comprise a model of the system.

16. The method of claim 11, wherein the models comprise a model of a photonic device of the group of photonic devices.

17. The method of claim 11, wherein the models comprise a model of an environment surrounding a photonic device of the group of photonic devices.

18. A machine-readable storage medium, comprising executable instructions that, when executed by one or more processing units, facilitate performance of operations, comprising:
determining indirect feedback tuning to perform on a photonic device, comprising:
indirectly determining an optical signal of the photonic device,
determining, based on the optical signal of the photonic device and a feedback model, the indirect feedback tuning required to decrease a bit error rate of the photonic device; and
causing a model-based controller to apply the indirect feedback tuning.

19. The machine-readable storage medium of claim 18, wherein the indirect feedback tuning comprises thermal tuning and electrical tuning.

20. The machine-readable storage medium of claim 18, wherein the indirect feedback tuning is determined using machine learning to repeatedly determine thermal effects and the feedback model, and wherein the feedback model is associated with the photonic device.

* * * * *